United States Patent
Uemura et al.

(10) Patent No.: US 10,110,117 B2
(45) Date of Patent: Oct. 23, 2018

(54) MULTILEVEL POWER CONVERSION DEVICE

(71) Applicant: MITSUBISHI ELECTRIC CORPORATION, Chiyoda-ku, Tokyo (JP)

(72) Inventors: Takumi Uemura, Tokyo (JP); Kota Teramoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/749,993

(22) PCT Filed: Oct. 15, 2015

(86) PCT No.: PCT/JP2015/079149
§ 371 (c)(1),
(2) Date: Feb. 2, 2018

(87) PCT Pub. No.: WO2017/064788
PCT Pub. Date: Apr. 20, 2017

(65) Prior Publication Data
US 2018/0234010 A1    Aug. 16, 2018

(51) Int. Cl.
*G05F 1/00* (2006.01)
*G05F 1/569* (2006.01)
(Continued)

(52) U.S. Cl.
CPC .............. *H02M 1/34* (2013.01); *H02M 1/36* (2013.01); *H02M 3/155* (2013.01); *H02M 7/5387* (2013.01); *H02M 2001/348* (2013.01)

(58) Field of Classification Search
CPC .................................. G05F 1/571; H02M 3/158
(Continued)

(56) References Cited

U.S. PATENT DOCUMENTS 4,698,736 A * 10/1987 Higa ................ H03K 17/08144
                                                    361/104
5,621,628 A *  4/1997 Miyazaki ................ H02M 5/45
                                                      363/37
(Continued)

FOREIGN PATENT DOCUMENTS

EP          2 816 717 A2    12/2014
JP          S 63-52667 A     3/1988
(Continued)

OTHER PUBLICATIONS

International Search Report (PCT/ISA/210) dated Dec. 28, 2015, by the Japan Patent Office as the International Searching Authority for International Application No. PCT/JP2015/079149.
(Continued)

*Primary Examiner* — Gary Nash
(74) *Attorney, Agent, or Firm* — Buchanan Ingersoll & Rooney PC

(57) ABSTRACT

A power converter has: switching elements connected in parallel to each of primary-side filter capacitors, freewheel diodes connected in parallel to the switching elements, and snubber resistances connected in parallel to the switching elements. The controller causes stoppage of the power converter by turning off each of the switching elements. After stoppage of the power converter, the controller causes a discharge circuit to operate by turning on a thyristor, thereby discharging the primary-side filter capacitors. By discharging of the primary-side filter capacitors, a secondary-side filter capacitor is discharged via the freewheel diodes.

3 Claims, 4 Drawing Sheets

(51) Int. Cl.
  *G05F 1/571* (2006.01)
  *H02M 1/00* (2006.01)
  *H02M 1/34* (2007.01)
  *H02M 7/5387* (2007.01)
  *H02M 3/155* (2006.01)
  *H02M 1/36* (2007.01)

(58) Field of Classification Search
  USPC .... 323/271, 274, 276, 284, 285; 363/65, 67, 363/68, 78, 89, 92, 129
  See application file for complete search history.

(56) References Cited

U.S. PATENT DOCUMENTS

| | | | |
|---|---|---|---|
| 5,790,396 A * | 8/1998 | Miyazaki | H02M 7/487 363/41 |
| 2016/0211749 A1* | 7/2016 | Okada | H02M 7/487 |

FOREIGN PATENT DOCUMENTS

| | | |
|---|---|---|
| JP | 2015-006077 A | 1/2015 |
| JP | 2015-100512 A | 6/2015 |
| WO | WO 2015/063898 A1 | 5/2015 |

OTHER PUBLICATIONS

Written Opinion (PCT/ISA/237) dated Dec. 28, 2015, by the Japan Patent Office as the International Searching Authority for International Application No. PCT/JP2015/079149.

* cited by examiner

MULTILEVEL POWER CONVERSION DEVICE

TECHNICAL FIELD

The present disclosure relates to a multilevel power conversion device.

BACKGROUND ART

An electric railway vehicle on which a power storage device is mounted stores in the power storage device regenerative power obtained by regenerative braking during deceleration, and uses the power of the power storage device to supplement power from an overhead line during acceleration.

A power conversion device disclosed in Patent Literature 1 includes an inverter device for driving an electric motor, a direct current (DC)-DC conversion device connected in parallel to the inverter device, and a power storage device connected to the DC-DC conversion device.

CITATION LIST

Patent Literature

Patent Literature 1: Unexamined Japanese Patent Application Kokai Publication No. 2015-006077

SUMMARY OF INVENTION

Technical Problem

When a voltage of output of a multilevel DC-DC converter becomes an overvoltage, a controller performs protective stoppage of the multilevel DC-DC converter. After stoppage, the power stored in a filter capacitor connected to a primary side of the multilevel DC-DC converter may cause charging of a filter capacitor connected to a secondary side of the multilevel DC-DC converter via a snubber resistance included in the multilevel DC-DC converter. When the filter capacitor connected to the secondary side is charged after protective stoppage, the voltage of the filter capacitor may become an overvoltage. Thus a problem occurs in that, when the DC-DC converter is restarted after the stoppage, the overvoltage occurs, and the DC-DC converter again stops.

The present disclosure is developed in consideration of the aforementioned circumstances, and an objective of the present disclosure is to suppress overvoltage of the output voltage of the multilevel power conversion device.

Solution to Problem

In order to attain the aforementioned objective, a multilevel power conversion device of the present disclosure includes:

a plurality of primary-side filter capacitors connected together in series;

a power converter having a primary-side positive terminal and a primary-side negative terminal connected to both ends of the plurality of primary-side filter capacitors;

a secondary-side filter capacitor connected between secondary-side terminals of the power converter;

a discharge circuit connected in parallel to the plurality of primary side filter capacitors or the secondary-side filter capacitor; and a controller.

The power converter includes:

(i) a plurality of switching elements, each switching element of the plurality of switching elements connected in parallel to a primary-side filter capacitor of the plurality of primary-side filter capacitors;

(ii) a plurality of freewheel diodes, each freewheel diode of the plurality of freewheel diodes connected in parallel to one of the plurality of switching elements; and (iii) a plurality of snubber resistances, each snubber resistance of the plurality of snubber resistances connected in parallel to one of the plurality of switching elements.

The power converter can output from the secondary-side terminals a plurality of voltage potentials between a voltage at the primary-side positive terminal and a voltage at the primary-side negative terminal, in response to ON-OFF switching of the switching elements ordered by the controller.

The controller, by causing the discharge to operate circuit after stoppage of the power converter, discharges the plurality of primary-side filter capacitors or the secondary-side filter capacitor.

Advantageous Effects of Invention

According to the present disclosure, by discharging the plurality of primary-side filter capacitors or the secondary-side filter capacitor after stoppage of the power converter, voltage of the output of the multilevel power conversion device can be prevented from becoming an overvoltage.

DESCRIPTION OF EMBODIMENTS

Embodiments of the present description are described below in detail in reference to figures. In the figures, components that are the same or equivalent are assigned the same reference signs.

Figure 1:
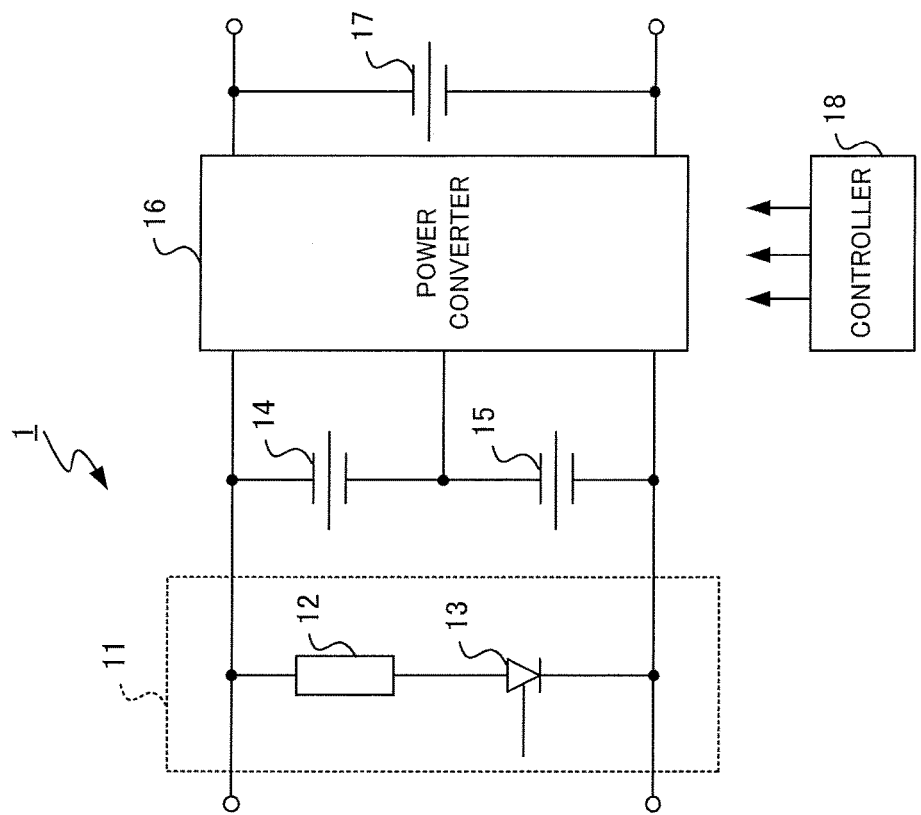
FIG. 1 is a block diagram illustrating an example configuration of a multilevel power conversion device according to an embodiment of the present disclosure.

FIG. 1 is a block diagram illustrating an example configuration of a multilevel power conversion device according to an embodiment of the present disclosure. A multilevel power conversion device (referred to hereinafter as the power conversion device) 1 includes: a discharge circuit 11, primary-side filter capacitors 14 and 15, a power converter 16 having a primary-side positive terminal and a primary-side negative terminal connected to both ends of the primary-side filter capacitors 14 and 15, a secondary-side filter capacitor 17 connected between secondary-side terminals of the power converter 16, and a controller 18 to control a discharge circuit 11 and the power converter 16. The power converter 16 can output from the secondary terminals a plurality of voltage potentials between a voltage at the primary-side positive terminal and a voltage at the primary-side negative terminal, in accordance with ON-OFF switching of switching elements ordered by the controller 18. The power converter 16 may perform bidirectional power conversion.

In the example of FIG. 1, the power conversion device 1 is a three-level power conversion device, and the power converter 16 is a three-level direct-current-to-direct-current (DC-DC) converter. As described below, the power converter 16 includes: switching elements connected in parallel to the primary-side filter capacitors 14 and 15, freewheel diodes connected in parallel to the switching elements, and snubber resistances connected in parallel to the switching elements. The number of primary-side filter capacitors included in the power conversion device 1 is not limited to two, the number of provided primary-side filter capacitors may be freely selected as a value greater than or equal to two, and the power conversion device 1 may be a five-level conversion device.

The discharge circuit 11 includes a discharge resistance 12 and a thyristor 13 connected in series to one another. In the example of FIG. 1, the discharge circuit 11 is connected to the primary-side filter capacitors 14 and 15, and when the thyristor 13 is turned ON by control by the controller 18, the discharge circuit discharges the primary-side filter capacitors 14 and 15. In the below described manner, when the primary-side filter capacitors 14 and 15 are discharged, the secondary-side filter capacitor 17 is discharged via a freewheel diode included in the power converter 16. The discharge circuit 11 may be connected to the secondary-side filter capacitor 17 so as to directly discharge the secondary-side filter capacitor 17. After stoppage of the power converter 16, the controller 18 causes the discharge circuit 11 to operate so as to discharge the primary-side filter capacitors 14 and 15, and thus the secondary-side filter capacitor 17 is discharged, and overvoltage of the output of the power conversion device 1 is suppressed.

Figure 2:
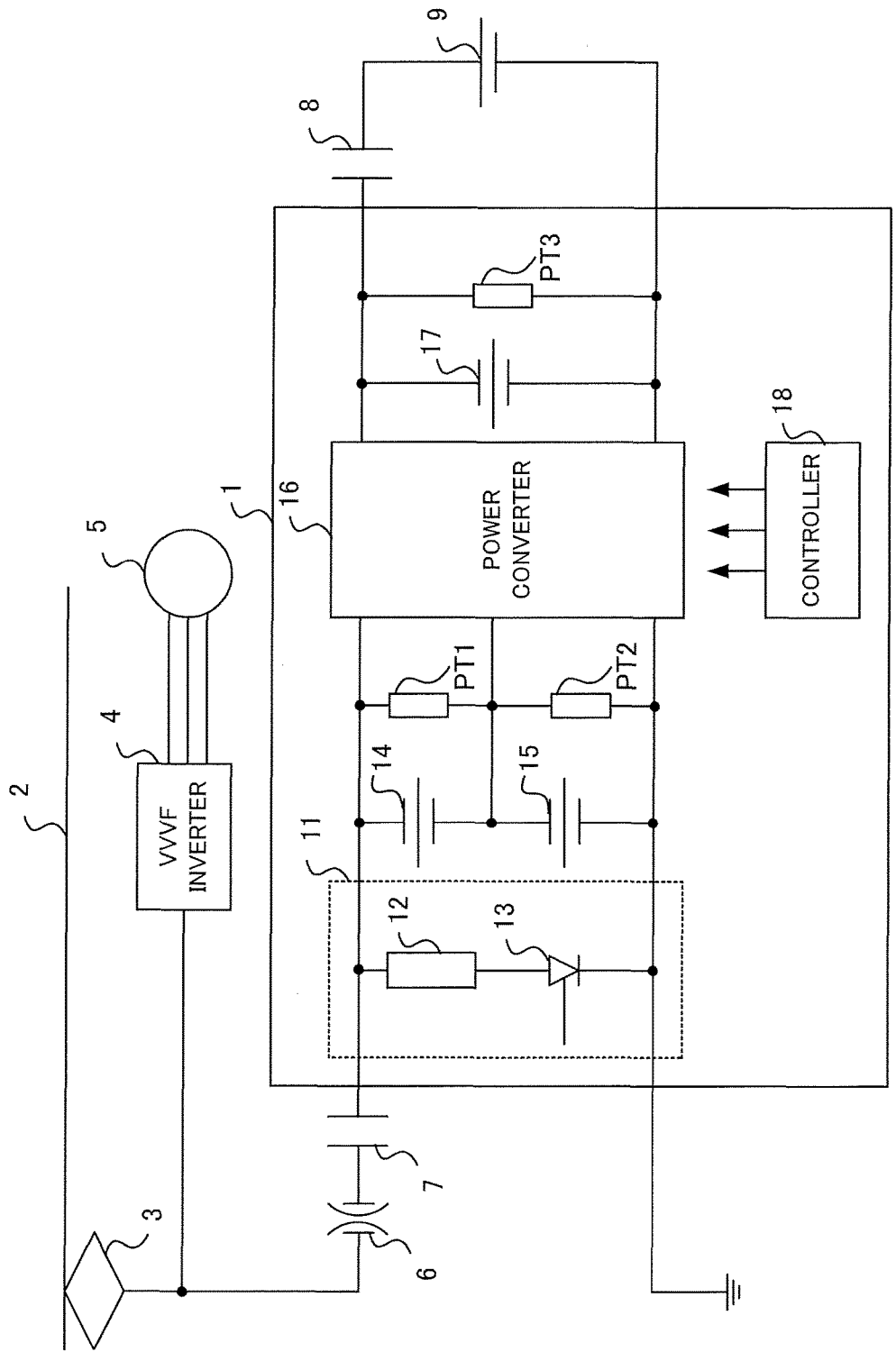
FIG. 2 is a drawing illustrating an example of mounting of the multilevel power conversion device according to the embodiment on an electric railway vehicle.

The power conversion device 1 is mounted on an electric railway vehicle (hereinafter, called an "electric vehicle") equipped with a power storage device. FIG. 2 is a drawing illustrating an example of mounting of the multilevel power conversion device according to the embodiment on the electric railway vehicle. The primary-side positive terminal of the power conversion device 1 is connected, via a circuit breaker 6 and a line breaker 7, to a current collector 3, which is a pantograph, and the primary-side negative terminal is grounded. A power storage device 9 is connected to the secondary side of the power conversion device 1 via a line breaker 8.

Power acquired from an overhead line 2 via the current collector 3 is converted by a variable voltage variable frequency (VVVF) inverter 4 and output to an electric motor 5, and the electric motor 5 runs. During acceleration of the electric vehicle, power discharged from the power storage device 9 is converted by the power converter 16 and is supplied to the VVVF inverter 4. That is to say, the electric motor 5 is driven, and the electric vehicle is accelerated, by power of the power storage device 9 in addition to power from the overhead line 2. During regenerative braking of the electric vehicle, the power generated by the electric motor 5 is converted by the power converter 16 and is supplied to the power storage device 9.

In the example of FIG. 2, a voltage detector PT1 detecting voltage of the primary-side filter capacitor 14, a voltage detector PT2 detecting voltage of the primary-side filter capacitor 15, and a voltage detector PT3 detecting voltage of the secondary-side filter capacitor 17 are provided. The controller 18 performs control of driving and stopping of the power converter 16 on the basis of detection results of the voltage detectors PT1, PT2, and PT3 and a drive command from a non-illustrated driver cab.

Figure 3:
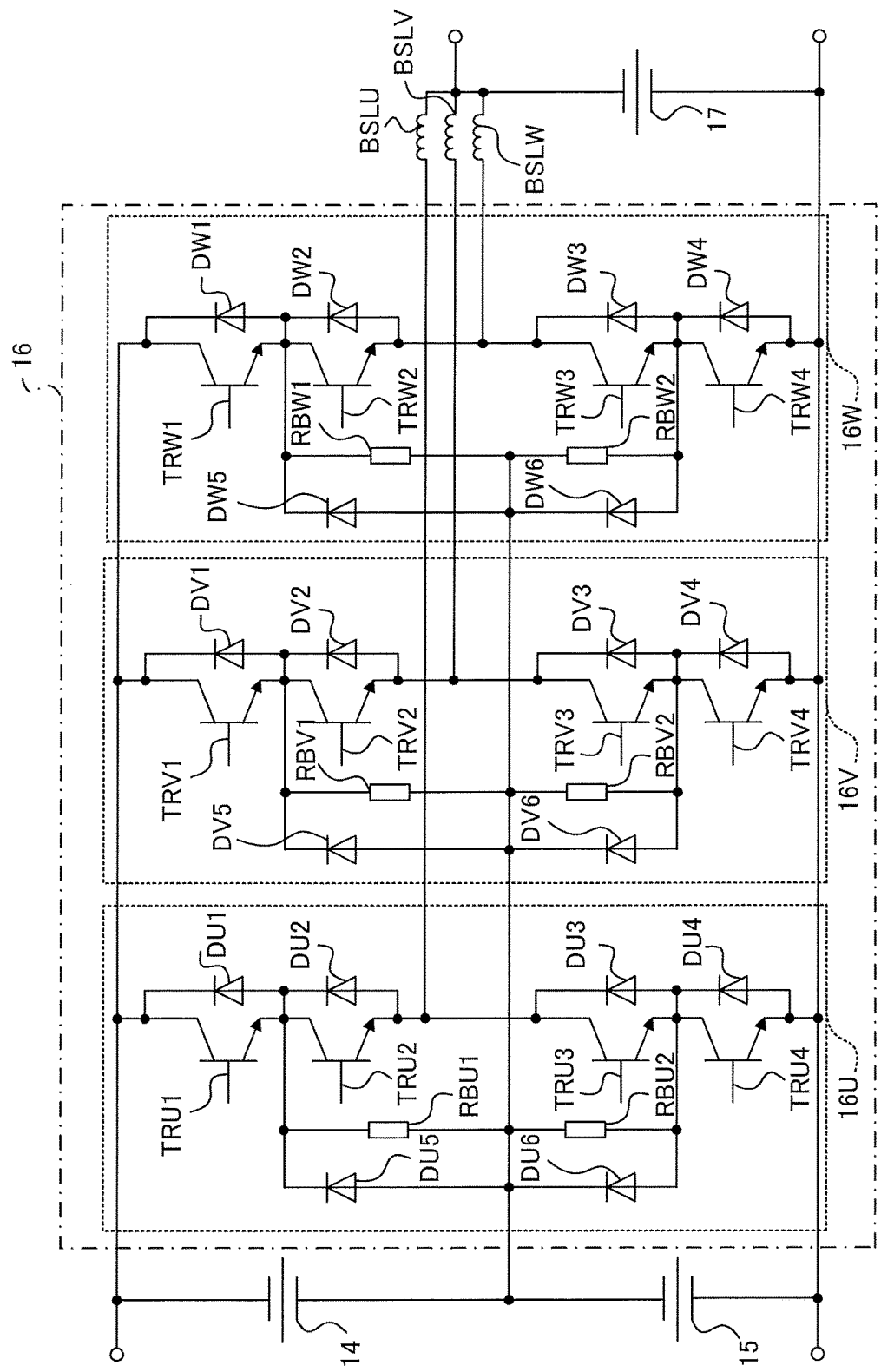
FIG. 3 is a block diagram illustrating an example configuration of the power converter according to the embodiment.

FIG. 3 is a block diagram illustrating an example configuration of the power converter according to the embodiment. The power converter 16 includes a U-phase arm 16U, a V-phase arm 16V, and a W-phase arm 16W, and each phase arm is similarly configured. In the description of the configuration of the power converter 1, the reference signs U, V, and W of the various phase arms are collectively referred to by the "x" reference sign.

The switching elements TRx1, TRx2, TRx3, and TRx4 are freely-selected semiconductor elements, and in the example of FIG. 3, the power converter 16 uses insulated gate bipolar transistors (IGBTs). The series-connected switching elements TRx1 and TRx2 are connected in parallel to the primary-side filter capacitor 14. The switching element TRx1 is connected in parallel to a freewheel diode Dx1, and the switching element TRx2 is connected in parallel to a freewheel diode Dx2. The switching element TRx2 is connected in parallel to a snubber resistance RBx1 and a clamp diode Dx5. The series-connected switching elements TRx3 and TRx4 are connected in parallel to the primary-side filter capacitor 15. The switching element TRx3 is connected in parallel to a freewheel diode Dx3, and the switching element TRx4 is connected in parallel to a freewheel diode Dx4. The switching element TRx3 is connected in parallel with a snubber resistance RBx2 and a clamp diode Dx6. Contact points of the switching elements TRx2 and TRx3 are connected to the secondary-side filter capacitor 17 via reactors BSLx.

Figure 4:
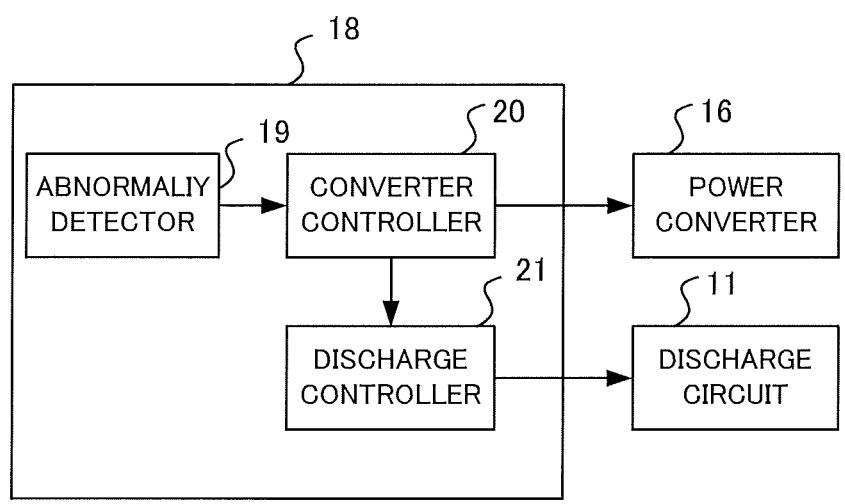
FIG. 4 is a block diagram illustrating an example configuration of the controller according to the embodiment.

The secondary-side filter capacitor 17, due to ON-OFF switching of the switching elements TRx1, TRx2, TRx3, and TRx4 ordered by the controller 18, is charged by power charged in the primary-side filter capacitors 14 and 15. After the switching elements TRx1, TRx2, TRx3, and TRx4 are switched OFF so that the power converter 16 stops, a circuit may be formed by which current flows from the contact point of the primary-side filter capacitors 14 and 15 to the secondary-side filter capacitor 17 through a snubber resistance RBU2, a freewheel diode DU3, and a reactor BSLU. Operation of the power conversion device 1 to suppress the secondary-side filter capacitor 17 becoming charged by the aforementioned circuit and the output voltage of the power conversion device 1 becoming the overvoltage is described below. FIG. 4 is a block diagram illustrating an example configuration of the controller according to the embodiment. The controller 18 includes: an abnormality detector 19 that detects abnormality in the interior and/or input-output of the power converter 16; a converter controller 20 that controls the power converter 16 on the basis of drive commands from the driver cab, detection results of the voltage detectors PT1, PT2, and PT3, and output of the abnormality detector 19; and a discharge controller 21 that performs ON-OFF control of the thyristor 13 included in the discharge circuit 11.

The abnormality detector 19 detects an abnormality of the power converter 16 when a detection result of any one of the voltage detectors PT1, PT2, and PT3 is greater than or equal to a respective determined threshold. The abnormality detector 19 may detect the abnormality of the power converter 16 when either the output current or the input current of the power converter 16 is greater than or equal to a respective determined threshold. The converter controller 20 outputs a control signal that controls ON-OFF switching of each of the switching elements TRx1 to TRx4. The converter controller 20 causes the power converter 16 to perform power conversion by ON-OFF switching of each of the switching elements TRx1 to TRx4. The converter controller 20 stops the power converter 16 by switching OFF of the respective switching elements TRx1 to TRx4. Stoppage of the power converter 16 includes: normal stoppage in which the power converter 16 stops when there is acquisition of a drive command that is an instruction to stop the power converter 16, and protective stoppage in which the power converter 16 is stopped in order to protect various electrical devices upon detection of an abnormality by the abnormality detector 19. During protective stoppage of the power converter 16, the line breakers 7 and 8 are opened.

After a control signal from the converter controller 20 turns OFF each of the switching elements TRx1 to TRx4 and the power converter 16 undergoes the normal stoppage or the protective stoppage, the discharge controller 21 turns ON the thyristor 13, thereby causing operation of the discharge circuit 11 and discharge of the primary-side filter capacitors 14 and 15. When the primary-side filter capacitors 14 and 15 discharge, the secondary-side filter capacitor 17 discharges via the freewheel diodes Dx1 and Dx2. Due to operation of the discharge circuit 11, after the normal stoppage or the protective stoppage of the power converter 16, the circuit can be formed in which current flows from the contact point of the primary-side filter capacitors 14 and 15 to the secondary-side filter capacitor 17 through the snubber resistance RBx2, the freewheel diode Dx3, and the reactor BSLx, the further charging of the secondary-side filter capacitor 17 can be suppressed, and overvoltage of the output of the power conversion device 1 can be suppressed.

The controller 18 may be operated such that the discharge circuit 11 operates only when the power converter 16 undergoes the protective stoppage. In this case, the discharge controller 21 turns ON the thyristor 13 only upon protective stoppage of the power converter 16.

The controller 18 may be operated such that the discharge circuit 11 operates only when the voltage of the secondary-side filter capacitor 17 is greater than or equal to a threshold after the normal stoppage or the protective stoppage of the power converter 16. In this case, upon normal stoppage or protective stoppage of the power converter 16, the discharge controller 21 turns the thyristor 13 ON only when the detection result of the voltage detector PT3 is greater than or equal to a threshold. Further, the discharge controller 21 may be operated such that the discharge circuit 11 operates only after protective stoppage of the power converter 16 so that the detection result of the voltage detector PT3 is greater than or equal to the threshold. The threshold values used in the determination of whether or not to cause the aforementioned operation of the discharge circuit 11 are determined in accordance with characteristics of the devices connected to the secondary side of the power conversion device 1. In the example of FIG. 2, the determination of the threshold values is made in accordance with the withstand voltage characteristics of the power storage device 9.

In above described manner, by use of the power conversion device 1 according to the present embodiment, overvoltage of the output voltage of the power conversion device 1 is suppressed by discharge of the primary-side filter capacitors 14 and 15 or the secondary-side filter capacitor 17 after the normal stoppage or the protective stoppage of the power converter 16.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Multilevel power conversion device
2 Overhead line
3 Current collector
4 VVVF inverter
5 Electric motor
6 Circuit breaker
7, 8 Line breaker
9 Power storage device
11 Discharge circuit
12 Discharge resistance
13 Thyristor
14, 15 Primary-side filter capacitor
16 Power converter
16U U-phase arm
16V V-phase arm
16W W-phase arm
17 Secondary-side filter capacitor
18 Controller
19 Abnormality detector
20 Converter controller
21 Discharge controller
BSLU, BSLV, BSLW Reactor
DU1, DU2, DU3, DU4, DV1, DV2, DV3, DV4, DW1, DW2, DW3, DW4 Freewheel diode
DU5, DU6, DV5, DV6, DW5, DW6 Clamp diode
PT1, PT2, PT3 Voltage detector
RBU1, RBU2, RBV1, RBV2, RBW1, RBW2 Snubber resistance
TRU1, TRU2, TRU3, TRU4, TRV1, TRV2, TRV3, TRV4, TRW1, TRW2, TRW3, TRW4 Switching element

The invention claimed is:

1. A multilevel power conversion device comprising:
a plurality of primary-side filter capacitors connected together in series;
a power converter having a primary-side positive terminal and a primary-side negative terminal connected to both ends of the plurality of the primary-side filter capacitors, the power converter including: (i) a plurality of switching elements connected in parallel to the plurality of primary-side filter capacitors, (ii) a plurality of freewheel diodes, each connected in parallel to one of the plurality of switching elements, and (iii) a plurality of snubber resistances, each connected in parallel to one of the plurality of switching elements;
a secondary-side filter capacitor connected between secondary-side terminals of the power converter;
a discharge circuit connected in parallel to the plurality of primary side filter capacitors or the secondary-side filter capacitor; and
a controller to perform control of the plurality of switching elements and the discharge circuit, wherein
multiple voltage potentials between a voltage at the primary-side positive terminal and a voltage at the primary-side negative terminal are outputable from the secondary side terminals by the controller commanding the plurality of switching elements to switch ON-OFF, and
the controller, after stoppage of the power converter, causes the discharge circuit to operate, thereby discharging the plurality of primary-side filter capacitors or the secondary-side filter capacitor.

2. The multilevel power conversion device according to claim 1, further comprising:

an abnormality detector to detect an abnormality in at least one of an interior or an input-output of the power converter, wherein the controller, upon detection of the abnormality by the abnormality, performs protective stoppage of the power converter, and thereafter upon the protective stoppage of the power converter, causes the discharge circuit to operate, thereby discharging the plurality of primary-side filter capacitors or the secondary-side filter capacitor.

3. The multilevel power conversion device according to claim 1, wherein the plurality of primary-side filter capacitors is two primary-side filter capacitors, the multilevel power conversion device further comprises a voltage detector to detect a voltage of the secondary-side filter capacitor, the power converter is a three-level direct current-direct current converter, the discharge circuit is connected in parallel to the two primary-side filter capacitors, and the controller, when the voltage detected by the voltage detector is greater than or equal to a threshold after stoppage of the power converter, causes to the discharge circuit to operate, thereby discharging the two primary-side filter capacitors.

* * * * *